United States Patent
Katusic et al.

(10) Patent No.: US 7,731,869 B2
(45) Date of Patent: Jun. 8, 2010

(54) STABILISED ALUMINIUM ZIRCONIUM MIXED OXIDE POWDER

(75) Inventors: Stipan Katusic, Bad Soden (DE); Juergen Meyer, Stockstadt (DE); Horst Miess, Kahl (DE); Monika Oswald, Hanau (DE); Matthias Rochnia, Ortenberg (DE)

(73) Assignee: Evonik Degussa GmbH, Essen (DE)

( * ) Notice: Subject to any disclaimer, the term of this patent is extended or adjusted under 35 U.S.C. 154(b) by 0 days.

(21) Appl. No.: 11/995,183

(22) PCT Filed: Jul. 14, 2006

(86) PCT No.: PCT/EP2006/064286

§ 371 (c)(1),
(2), (4) Date: Jan. 9, 2008

(87) PCT Pub. No.: WO2007/023033

PCT Pub. Date: Mar. 1, 2007

(65) Prior Publication Data

US 2008/0217591 A1    Sep. 11, 2008

(30) Foreign Application Priority Data

Aug. 25, 2005    (DE) ........................ 10 2005 040 156

(51) Int. Cl.
*H01B 1/08* (2006.01)
(52) U.S. Cl. .................. 252/518.1; 252/520.5; 423/266
(58) Field of Classification Search ............. 252/518.1, 252/520.5; 423/266; 502/302
See application file for complete search history.

(56) References Cited

U.S. PATENT DOCUMENTS 5,002,909 A * 3/1991 Montino et al. ............. 501/105

(Continued)

FOREIGN PATENT DOCUMENTS

AO    2004 115343    4/2004

(Continued)

OTHER PUBLICATIONS

Jossen, et al., "Morphology and composition of spray-flame-made yttria-stabilized zirconia nanoparticles", Nanotechnology, vol. 16, pp. S609-S617, 2005.

(Continued)

*Primary Examiner*—Mark Kopec
(74) *Attorney, Agent, or Firm*—Oblon, Spivak, McClelland, Maier & Neustadt, L.L.P.

(57) ABSTRACT

Mixed oxide powder consisting of particles with the components zirconium dioxide, aluminium oxide and at least a third component selected from the group including yttrium oxide, magnesium oxide or calcium oxide, wherein mixed oxide powder has an aluminium oxide content 0.01 to 10 wt. % and is homogeneously distributed in the mixed oxide particles, the content of aluminium oxide, zirconium dioxide and yttrium oxide is at least 99.5 wt. %, based on the total quantity of the powder, and the BET surface area is 20 to 80 m2/g. It is obtained by atomising a solution containing at least one starting compound for each of aluminium oxide, zirconium dioxide and the third component, allowing the atomised solution to react with oxygen in a reaction chamber at a reaction temperature 700 to 15000° C., cooling the hot gases and the solid products and then separating the solid product from the gases. It can be used as a dental material.

25 Claims, 1 Drawing Sheet

U.S. PATENT DOCUMENTS

Figure 1:

| | | | |
|---|---|---|---|
| 5,122,487 A | * | 6/1992 | Hayakawa et al. .......... 501/103 |
| 5,310,575 A | * | 5/1994 | Friese et al. ............. 427/126.3 |
| 5,926,595 A | * | 7/1999 | Matsui et al. ................. 385/78 |
| 2003/0101659 A1 | * | 6/2003 | Katusic et al. ................ 51/309 |

FOREIGN PATENT DOCUMENTS

| | | |
|---|---|---|
| AP | 2001 080919 | 3/2001 |
| JP | 2001-080919 * | 3/2001 |
| JP | 2004-115343 * | 4/2004 |

OTHER PUBLICATIONS

Gaudon, et al., "Morphology and sintering behaviour of yttria stabilised zirconia (8-YSZ) powders synthesised by spray pyrolysis", Ceramics International, vol. 30, No. 8, pp. 2295-2303, 2004.

* cited by examiner

STABILISED ALUMINIUM ZIRCONIUM MIXED OXIDE POWDER

The invention relates to a stabilised aluminium zirconium mixed oxide powder, and the production and use thereof.

In EP-A-495662, a fire-resistant material made of aluminium oxide, zirconium dioxide and yttrium oxide, which is formed by fusing the individual components together, is disclosed.

In JP-A-6234526, particles which contain ca. 0.1 wt. % of aluminium oxide are obtained by fusing together aluminium oxide, zirconium dioxide and yttrium oxide. The BET surface area of the particles is 3 to 12 m$^2$/g and they have a mean particle diameter of 0.5 to 2 μm.

In JP-A-2001080919, a powder with a BET surface area of 5 to 30 m$^2$/g is obtained by calcination of an aluminium compound with zirconium dioxide hydrate which contains at least one yttrium, magnesium, calcium or caesium compound. The aluminium oxide content is preferably 0.01-2 wt. %. The powder is obtained by treatment of a reaction mixture containing a zirconium dioxide sol, yttrium chloride and aluminium chloride at ca. 1000° C. and subsequent grinding of the particles.

A disadvantage in the process according to the state of the technology is the uneven distribution of the aluminium oxide component, which can lead to cracks during production, particularly of ceramics. A further disadvantage is the high content of impurities in the product, caused by the starting materials, such as for example chloride. A contamination can also result from the process operation, for example the supplementary grinding of the powder. A further disadvantage is that the powders according to the state of the technology are often not sufficiently finely divided for ceramics.

The purpose of the invention was therefore to provide a powder based on zirconium dioxide which overcomes the disadvantages of the state of the technology and can be used for the production of high quality ceramics.

The object of the invention is a mixed oxide powder consisting of particles with the components zirconium dioxide, aluminium oxide and at least a third component selected from the group comprising yttrium oxide, magnesium oxide or calcium oxide, wherein the aluminium oxide content is 0.01 to 10 wt. % and is homogeneously distributed in the mixed oxide particles the content of aluminium oxide, zirconium dioxide and yttrium oxide is at least 99.5 wt. %, based on the total quantity of the powder and the BET surface area is 20 to 80 m$^2$/g.

The aluminium oxide content can preferably be 0.1 to 1 wt. %, based on the total quantity of the powder.

The content of aluminium oxide, zirconium dioxide and yttrium oxide can preferably be at least 99.7 wt. %, based on the total quantity of the powder.

The zirconium dioxide content of the mixed oxide powder according to the invention can preferably be at least 75 wt. %, based on the total quantity of the powder. Particularly preferred is a zirconium dioxide content of 85-95 wt. %. Here, the zirconium dioxide fraction can contain 0 to 4 wt. % of hafnium dioxide.

The third component is preferably present in a quantity such that the tetragonal or cubic zirconium dioxide phase is stabilised. The quantity is different for the said compounds and for the said zirconium dioxide phases and is known to the skilled person.

Preferably, yttrium oxide is the third component in the mixed oxide powder according to the invention. An yttrium oxide content of 5 to 15 wt. %, based on the total quantity of the powder, is preferable here.

Further, the mixed oxide powder according to the invention can contain carbon. The content of carbon is preferably less than 0.3 wt. % and particularly preferably less than 0.15 wt. %, each based on the mixed oxide powder.

Further, the mixed oxide powder according to the invention can contain chloride. The content of chloride is preferably less than 200 ppm and particularly preferably less than 100 ppm, each based on the mixed oxide powder.

The particles of the mixed oxide powder according to the invention are preferably free from amorphous components. Further, in the X-ray diffraction diagram they preferably show the pattern of tetragonal zirconium dioxide and no signals from aluminium oxide modifications.

The BET surface area of the mixed oxide powder according to the invention is preferably >30 to 70 m$^2$/g.

The mixed oxide powder according to the invention is preferably in the form of aggregated particles.

A further object of the invention is a process wherein a solution containing, depending on the later desired ratio in the mixed oxide powder, at least one starting compound for each of aluminium oxide, zirconium dioxide and the third compound, is atomised, the atomised solution is allowed to react with oxygen in a reaction chamber at a reaction temperature 700 to 1500° C., the quantity of oxygen at least sufficing completely to convert the starting compounds, the hot gases and the solid products are cooled and then the solid product is separated from the gases.

In a preferred embodiment, the starting compounds are converted in a flame formed by the reaction of oxygen, a hydrogen-containing fuel gas and the solution. Oxygen is as a rule used in the form of air or air enriched with oxygen. As hydrogen-containing fuel gases, hydrogen, methane, ethane, propane, butane and/or natural gas can be used, hydrogen being particularly preferred.

As starting compounds for aluminium oxide, organic compounds can preferably be used. Particularly suitable are aluminium alcoholates, such as for example aluminium tri-sec.-butylate.

As starting compounds for zirconium dioxide, organic compounds can preferably be used. Particularly suitable are zirconium(IV) ethylate, zirconium(IV) n-propylate, zirconium(IV) iso-propylate, zirconium (IV) n-butylate, zirconium (IV) tert.-butylate and/or zirconium(IV) 2-ethylhexanoate.

As starting compounds for the third component, both organic and also inorganic compounds can be used. These can for example be chlorides, nitrates, carbonates, sulphates or carboxylates. Particularly suitable are yttrium nitrate, yttrium chloride, yttrium carbonate, yttrium sulphate or yttrium 2-ethylhexanoate.

The starting compounds are preferably present dissolved in one or several organic solvents. Methanol, ethanol, n-propanol, iso-propanol, n-butanol, tert.-butanol, 2-propanone, 2-butanone, diethyl ether, tert.butyl methyl ether, tetrahydrofuran, carboxylate esters, toluene and/or petroleum ether can be particularly suitable.

The residence time in the flame is preferably 5 to 30 milliseconds. The reaction temperature is preferably 800 to 1200° C., determined 500 mm below the flame.

A further object of the invention is the use of the mixed oxide powder according to the invention as a filler, as a support material, as a catalytically active substance, in fuel cells, as a dental material, for the production of membranes, as an additive in the silicone and rubber industry, for the adjustment of the rheology in liquid systems, for heat shield stabilisation and in the lacquer industry.

EXAMPLES

BET: determined as per DIN 66131
TEM/EDX: Energy Dispersive X-ray Analysis (EDX)
TEM: Jeol 2070-F; EDX: Noran Voyager 4.2.3
Content: The content of the powder components is determined by X-ray fluorescence analysis and/or chemical analysis.

Mean aggregate size in a dispersion ($d_{50}$ value): a 1 percent mixture of the powder with water is first predispersed using a dissolver. This predispersion is then dispersed using ultrasound. As the method for the determination of the particle size, photon correlation spectroscopy (PCS) is used.

Solutions Used (all values in wt. %)

Zirconium Dioxide Starting Compounds
Zr-1: zirconium salt of 2-ethylhexanoic acid (as $ZrO_2$) 25.4; 2-ethylhexanoic acid 39.6; 2-butoxyethoxyethanol 3.5; solvent naphtha 31.5.
Zr-2: zirconium tetrapropanolate 70; 1-propanol 30.
Zr-3: zirconium salt of 2-ethylhexanoic acid 70; naphtha 30

Yttrium Oxide Starting Compounds
Y-1: $Y(NO_3)_3 \cdot 6H_2O$ 33.9; acetone 66.1.
Y-2: $Y(NO_3)_3 \cdot 6H_2O$ 16.9; 2-butanol 41.5; methyl 2-propylacetate 41.5.
Y-3: yttrium salt of 2-ethylhexanoic acid 30, white spirit 50; 2-ethylhexanoic acid 20

Aluminium Oxide Starting Compounds
Al-1: Al(sec-butylate)$_3$ 24.2, acetone 75.8.
Al-2: Al(sec-butylate)$_3$ 24.2, solvent naphtha 75.8.

The solutions of the zirconium, yttrium and aluminium oxide starting materials are mixed in the concentrations stated in the table. The resulting solution remains stable, no precipitates are formed.

Next the resulting solution is atomised with air. The droplets obtained have a drop size spectrum $d_{30}$ of 5 to 15 μm. The droplets are incinerated in a flame formed from hydrogen and primary air, in a reaction chamber. In addition, secondary air is introduced into the reaction chamber. Next the hot gases and the powder are cooled in a cooling stretch. The powder is separated in filters.

The table also contains analytical values for the powders obtained.

The powders from the Examples 1 to 15 according to the invention have a BET surface area of up to 60 m$^2$/g. The size of the particles obtained can be determined from the X-ray diffraction diagram. The values obtained show that this is nanoscale powder. The carbon content of the samples produced is below 0.15 wt. %, and the chlorine content a maximum of 100 ppm.

TEM photographs confirm that the powders of Examples 1 to 15 are present in the form of aggregated primary particles. FIG. 1 shows a high resolution TEM photograph of the mixed oxide powder from Example 10, which confirms that the primary particles have a crystalline structure. The lattice planes can be clearly discerned. 0.29 and 0.25 nm were found as d values.

Further, TEM/EDX measurements of Examples 1 to 15 show that the Zr/Y/Al ratios in all primary particles are essentially the same. This applies also for powders with a very low content of the Al component (Examples 1, 2 and 11). The results of the nanospot-EDX analyses in high resolution TEM (spots 1 to 5 in FIG. 1) show that Al is mainly present homogeneously distributed in the Zr/Y matrix. Isolated fractions of aluminium oxide modifications—separated from the Zr/Y matrix—are not present. Amorphous deposits are not present.

The X-ray diffraction diagrams show that the zirconium dioxide fraction of the powders of Examples 1 to 15 is present exclusively in the tetragonal phase. Further, the X-ray diffraction diagrams of the powders from Examples 1 to 15 show no signals whatever of aluminium oxide modifications. The Al atoms are very homogeneously distributed in the Zr/Y oxide matrix. Aluminium oxide clusters were not found.

1 percent dispersions of the powders of Examples 1 to 8 produced using ultrasound have a mean aggregate size $d_{50}$ in the dispersion of 105 to 161 nm.

TABLE

Substances used and analytical values for the powders obtained

| Example | | 1 | 2 | 3 | 4 | 5 | 6 | 7 |
|---|---|---|---|---|---|---|---|---|
| Solution Zr— | g/hr | 2 | 2 | 2 | 2 | 2 | 1/3 *) | 1 |
| | | 1682 | 1513 | 1345 | 1345 | 1261 | | 1223 |
| Solution Y— | g/hr | 1 | 1 | 1 | 1 | 1 | 2 | 2 |
| | | 272 | 245 | 218 | 218 | 204 | 192 | 356 |
| Solution Al— | g/hr | 2 | 2 | 2 | 2 | 2 | 2 | 2 |
| | | 26 | 23 | 21 | 21 | 19 | 18 | 20 |
| Solution total | g/hr | 2000 | 1800 | 1600 | 1600 | 1500 | 1600 | 1600 |
| Hydrogen | Nm$^3$/hr | 3.0 | 2.5 | 1.6 | 1.4 | 1.4 | 1.6 | 1.8 |
| Atomising air | Nm$^3$/hr | 2.0 | 3.0 | 4.0 | 6.0 | 6.0 | 6.0 | 6.0 |
| Primary air | Nm$^3$/hr | 10.0 | 10.0 | 10.0 | 10.0 | 10.0 | 10.0 | 10.0 |
| Secondary air | Nm$^3$/hr | 16.0 | 16.0 | 20.0 | 20.0 | 20.0 | 21.0 | 20.0 |
| Total air | Nm$^3$/hr | 28.0 | 29.0 | 34.0 | 36.0 | 36.0 | 37.0 | 36.0 |
| Temperature **) | ° C. | 1065 | 1050 | 955 | 903 | 900 | 910 | 915 |
| Residence time | msec | 40 | 39 | 25 | 25 | 25 | 24 | 25 |
| $ZrO_2$ | wt. % | 94.59 | 94.33 | 94.43 | 94.42 | 94.68 | 94.49 | 94.29 |
| $Y_2O_3$ | | 5.31 | 5.41 | 5.31 | 5.31 | 5.31 | 5.26 | 5.40 |
| $Al_2O_3$ | | 0.25 | 0.25 | 0.26 | 0.25 | 0.24 | 0.24 | 0.30 |
| BET surface area | m$^2$/g | 25 | 29 | 45 | 55 | 60 | 60 | 58 |
| Carbon | wt. % | 0.09 | 0.10 | 0.11 | 0.14 | 0.14 | 0.13 | 0.11 |
| Chlorine | ppm | 90 | 70 | 99 | 100 | 60 | 86 | 75 |
| $d_{50}$ ***) | nm | 161 | 160 | 148 | 130 | 129 | 120 | 105 |

TABLE-continued

Substances used and analytical values for the powders obtained

| Example | | 8 | 9 | 10 | 11 | 12 | 13 | 14 | 15 |
|---|---|---|---|---|---|---|---|---|---|
| Solution Zr— | g/hr | 3 1313 | 2 1163 | 2 1012 | 2 1021 | 1 1400 | 3 1500 | 3 1300 | 1 1248 |
| Solution Y— | g/hr | 2 366 | 1 194 | 1 176 | 1 461 | 1 300 | 1 250 | 1 200 | 3 218 |
| Solution Al— | g/hr | 2 20 | 2 242 | 2 512 | 2 17 | 1 30 | 1 25 | 2 20 | 1 34 |
| Solution total | g/hr | 1700 | 1600 | 1700 | 1500 | 1730 | 1775 | 1520 | 1500 |
| Hydrogen | $Nm^3/hr$ | 2.1 | 2.0 | 2.0 | 3.0 | 3.0 | 3.0 | 3.0 | 3.0 |
| Atomising air | $Nm^3/hr$ | 7.0 | 5.0 | 5.0 | 5.0 | 5.0 | 5.0 | 5.0 | 5.0 |
| Primary air | $Nm^3/hr$ | 10.0 | 10.0 | 10.0 | 10.0 | 10.0 | 10.0 | 10.0 | 10.0 |
| Secondary air | $Nm^3/hr$ | 23.0 | 20.0 | 20.0 | 22.0 | 22.0 | 20.0 | 20.0 | 20.0 |
| Total air | $Nm^3/hr$ | 40.0 | 35.0 | 35.0 | 37.0 | 37.0 | 35.0 | 35.0 | 35.0 |
| Temperature **) | ° C. | 944 | 943 | 940 | 1065 | 1065 | 1100 | 1100 | 1065 |
| Residence time | msec | 20 | 25 | 25 | 24 | 24 | 23 | 24 | 25 |
| $ZrO_2$ | wt. % | 94.30 | 91.40 | 87.09 | 86.23 | 91.86 | 93.28 | 93.77 | 94.50 |
| $Y_2O_3$ | | 5.40 | 5.29 | 5.26 | 13.52 | 7.75 | 6.41 | 5.93 | 5.5 |
| $Al_2O_3$ | | 0.29 | 3.30 | 7.65 | 0.24 | 0.38 | 0.31 | 0.29 | 0.5 |
| BET surface area | $m^2/g$ | 56 | 44 | 47 | 23 | 70 | 62 | 61 | 66 |
| Carbon | wt. % | 0.12 | 0.1 | 0.11 | 0.15 | 0.11 | 0.12 | 0.09 | 0.09 |
| Chlorine | ppm | 66 | 90 | 80 | 40 | 60 | 75 | 60 | 60 |
| $d_{50}$ ***) | nm | 107 | 110 | 106 | 120 | 116 | 106 | 101 | 101 |

*) 1: 680, 2: 709
**) 500 mm below flame;
***) 1 percent dispersion in water; PCS;

The invention claimed is:

1. A mixed oxide powder comprising particles comprising zirconium dioxide, aluminium oxide and at least a third component selected from the group consisting of yttrium oxide, magnesium oxide and calcium oxide, wherein
the aluminium oxide content is 0.01 to 10 wt. % and is homogeneously distributed in the mixed oxide particles,
the content of aluminium oxide, zirconium dioxide and yttrium oxide is at least 99.5 wt. %, based on the total quantity of the powder,
the BET surface area is 20 to 80 $m^2/g$, and
wherein said mixed oxide powder contains tetragonal phase $ZrO_2$ and is free from amorphous components, and wherein said metal oxide powder has a C content of 0.015 wt % or less and a Cl content of 100 ppm or less.

2. The mixed oxide powder according to claim 1, wherein the aluminium oxide content is 0.1 to 1 wt. %, based on the total quantity of the powder.

3. The mixed oxide powder according to claim 1, wherein the content of aluminium oxide, zirconium dioxide and yttrium oxide is at least 99.7 wt. %, based on the total quantity of the powder.

4. The mixed oxide powder according to claim 1, wherein the zirconium dioxide content, based on the total quantity of the powder, is at least 75 wt. %.

5. The mixed oxide powder according to claim 4, wherein the zirconium dioxide comprises 0 to 4 wt. % of hafnium dioxide.

6. The mixed oxide powder according to claim 1, wherein the third component is present in a quantity such that a tetragonal or cubic zirconium dioxide phase is stabilised.

7. The mixed oxide powder according to claim 1, wherein the third component is yttrium oxide.

8. The mixed oxide powder according to claim 7, wherein the powder comprises 5 to 15 wt. % of yttrium oxide, based on the total quantity of the powder.

9. The mixed oxide powder according to claim 1, wherein the carbon content, based on the mixed oxide powder, is less than 0.3 wt. %.

10. The mixed oxide powder according to claim 1, wherein the chloride content, based on the mixed oxide powder, is 200 ppm at most.

11. The mixed oxide powder according to claim 1, wherein the particles comprise no amorphous components.

12. The mixed oxide powder according to claim 1, wherein a X-ray diffraction diagram of the powder shows a pattern of tetragonal zirconium dioxide.

13. The mixed oxide powder according to claim 1, wherein a X-ray diffraction diagram of the powder shows no signals from aluminium oxide.

14. The mixed oxide powder according to claim 1, wherein the powder has a BET surface area of >30 to 70 $m^2/g$.

15. The mixed oxide powder according to claim 1, wherein the powder is in the form of aggregated particles.

16. A process for the production of the mixed oxide powder according to claim 1, comprising:
atomizing a solution comprising, depending on the later desired ratio in the mixed oxide powder, at least one starting compound for each of aluminium oxide, zirconium dioxide and the third component;
reacting the atomised solution with oxygen in a reaction chamber at a reaction temperature 700 to 1500° C., the quantity of oxygen being at least sufficient to completely convert the starting compounds;
cooling the hot gases and the solid products; and
separating the solid product from the gases.

17. The process according to claim 16, wherein the starting compounds are converted in a flame formed by the reaction of oxygen, a hydrogen-containing fuel gas, and the solution.

18. The process according to claim 16, wherein the starting compounds for aluminium oxide are of organic origin.

19. The process according to claim 16, wherein the starting compounds for zirconium dioxide are of organic origin.

20. The process according to claim 16, wherein the starting compounds for the third component are of inorganic and/or organic origin.

21. The process according to claim 16, wherein the starting compounds are dissolved in one or several organic solvents.

22. The process according to claim 16, wherein the residence time of the starting compounds in a high temperature zone is 5 to 30 milli-seconds.

23. The process according to claim 16, wherein the reaction temperature is 800 to 1200° C., determined 500 mm below the flame.

24. The mixed oxide powder according to claim 1, wherein the third component is magnesium oxide.

25. The mixed oxide powder according to claim 1, wherein the third component is calcium oxide.

* * * * *